(12) United States Patent
Fang et al.

(10) Patent No.: US 9,851,494 B2
(45) Date of Patent: Dec. 26, 2017

(54) BACKLIGHT MODULE AND LIQUID CRYSTAL DISPLAY APPARATUS

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Zhixiang Fang, Beijing (CN); Ming Hu, Beijing (CN)

(73) Assignees: BOE TECHNOLOGY GROUP CO., LTD. (CN); HEFEI XINSHENG OPTOELECTRONICS TECHNOLOGY CO., LTD. (CN)

( * ) Notice: Subject to any disclaimer, the term of this patent is extended or adjusted under 35 U.S.C. 154(b) by 307 days.

(21) Appl. No.: 14/769,272

(22) PCT Filed: Mar. 25, 2015

(86) PCT No.: PCT/CN2015/075035
§ 371 (c)(1),
(2) Date: Aug. 20, 2015

(87) PCT Pub. No.: WO2016/078280
PCT Pub. Date: May 26, 2016

(65) Prior Publication Data
US 2016/0341887 A1    Nov. 24, 2016

(30) Foreign Application Priority Data

Nov. 20, 2014   (CN) .......................... 2014 1 0675851

(51) Int. Cl.
*G02F 1/1333*   (2006.01)
*F21V 8/00*   (2006.01)

(52) U.S. Cl.
CPC ......... *G02B 6/0088* (2013.01); *G02B 6/0055* (2013.01); *G02F 1/133308* (2013.01);
(Continued)

(58) Field of Classification Search
CPC ................................................. G02F 1/133308
See application file for complete search history.

(56) References Cited

U.S. PATENT DOCUMENTS 8,876,308 B2    11/2014   Lin et al.
9,301,428 B2 *   3/2016   Yu ....................... H05K 7/20409
(Continued)

FOREIGN PATENT DOCUMENTS

CN    102588846 A    7/2012
CN    102778769 A    11/2012
(Continued)

OTHER PUBLICATIONS

Office Action in Chinese Patent Application No. 201410675851.6, dated Mar. 30, 2016.
(Continued)

*Primary Examiner* — Phu Vu
(74) *Attorney, Agent, or Firm* — Brooks Kushman P.C.

(57) ABSTRACT

There is provided in the present disclosure backlight module, comprising: a backplate; a backlight source and an optical component disposed on the backplate; a frame configured to fix the backlight source and the optical component, wherein at the top of the frame is provided a cover which is integrally formed with the frame and extends to a middle part of the backlight module.

16 Claims, 3 Drawing Sheets

(52) U.S. Cl.
CPC ............ *G02F 2001/133317* (2013.01); *G02F 2202/28* (2013.01)

(56) References Cited

U.S. PATENT DOCUMENTS

| | | |
|---|---|---|
| 9,488,856 B2 | 11/2016 | Li |
| 2007/0132906 A1 | 6/2007 | Shen et al. |

FOREIGN PATENT DOCUMENTS

| | | |
|---|---|---|
| CN | 102809132 A | 12/2012 |
| CN | 202581171 U | 12/2012 |
| CN | 102914909 A | 2/2013 |
| CN | 202720414 U | 2/2013 |
| CN | 102998846 A | 3/2013 |
| CN | 103676278 A | 3/2014 |
| CN | 203641997 U | 6/2014 |
| CN | 203689256 U | 7/2014 |
| CN | 104062782 A | 9/2014 |
| CN | 204100058 U | 1/2015 |
| CN | 104344292 A | 2/2015 |
| JP | 2000-066204 A | 3/2000 |

OTHER PUBLICATIONS

International Search Report and Written Opinion in PCT International Application No. PCT/CN2015/075035, dated Jul. 9, 2015.
English Translation of the International Search Report for Application No. PCT/CN2015/075035, dated Jul. 9, 2015, 5 pages.
Office Action in Chinese Patent Application No. 201410675851.6, dated Nov. 1, 2016.

\* cited by examiner

BACKLIGHT MODULE AND LIQUID CRYSTAL DISPLAY APPARATUS

CROSS-REFERENCE TO RELATED APPLICATIONS

The present application is the U.S. National Phase of PCT Application No. PCT/CN2015/075035 filed on Mar. 25, 2015, which claims a priority of the Chinese Patent Application No. 201410675851.6 filed on Nov. 20, 2014, which is incorporated herein by reference in its entirety.

TECHNICAL FIELD

The present disclosure relates to the field of display technology, in particular to a backlight module and a liquid crystal display apparatus.

BACKGROUND

Since liquid crystal does not emit light spontaneously, a variety of liquid crystal display (hereinafter referred to as "LCD") apparatuses, such as a liquid crystal display and a liquid crystal display television and the like, need to realize displaying by means of an external backlight module. As shown in FIG. 1, the backlight module includes from lower to top a backplate 1, a reflection plate 10, a light guide plate 9 and an optical film 8 which are disposed on the backplate 1, and further includes a backlight source (not shown in the figure) and an frame 4' configured to fix the reflection plate 10, the light guide plate 9 and the optical film 8, wherein a liquid crystal panel 7 is disposed on a protruded platform at the inner side of the frame 4'. For small and middle size liquid display modules, the liquid crystal panel 7 and the backlight module are fixedly assembled by adhering the backplate 1 and a non-display region of the display side of the liquid crystal panel 7 via an adhesive tape 3. The reference mark 13 in FIG. 1 indicates a base material that provides adhesive coating for the adhesive tape 3.

As shown in FIG. 1, when the liquid crystal display device further includes other add-on function panels such as a touch panel, a raster and so on, the add-on function panel is assembled by means of surface adhering, i.e., coating an optical adhesive layer 15 (transparent) on the entire surface of the function panel 16 opposite to the liquid crystal panel 7, so as to be adhered to the liquid crystal panel 7 and the base material 13 via the optical adhesive layer 15.

However, due to insufficient rigidity of the adhesive tape 3 itself as well as existence of an area 17 having insufficient support, the adhering effect of the function panel 16 and the base material 13 of the adhesive tape 3 is poor, which would result in the problem of light leakage and whitening occurring around a product in the effect of pressure.

SUMMARY

There is provided in the present disclosure a backlight module and a liquid crystal display apparatus, which are configured to resolve the problem in the prior art that when a liquid crystal panel comprises an add-on function panel, the adhering effect of the function panel and the backlight module is poor, thereby resulting in the problem of light leakage and whitening occurring around a product.

In order to resolve the above technical problem, there is provided in an embodiment of the present disclosure a backlight module, comprising:
a backplate;
a backlight source and an optical component disposed on the backplate;
a frame configured to fix the backlight source and the optical component, wherein at the top of the frame is provided a cover which is integrally formed with the frame and extends to a middle part of the backlight module.

Optionally, the cover is of a plate-type structure.

Optionally, an adhesive overflow groove is disposed on an upper surface of the cover.

Optionally, an adhering layer is disposed on a lower surface of the cover.

Optionally, the adhering layer corresponds to a non-display area of a liquid crystal panel.

Optionally, the adhering layer is a double-sided adhesive tape

Optionally, a protruded platform is disposed at the inner side of the frame close to the middle part of the backlight module, and a first supporting elastomer is disposed on the lower surface of the cover and a position of the first supporting elastomer corresponds to the protruded platform.

Optionally, a second supporting elastomer is disposed on a surface of the protruded platform, and the liquid crystal panel is arranged between the first supporting elastomer and the second supporting elastomer.

Optionally, a first protruded platform and a second protruded platform are disposed at the inner side of the frame close to the middle part of the backlight module, and a first supporting elastomer is disposed on the lower surface of the cover and a position of the first supporting elastomer corresponds to the first protruded platform.

Optionally, a second supporting elastomer is disposed on a surface of the first protruded platform, and the liquid crystal panel is arranged between the first supporting elastomer and the second supporting elastomer.

Optionally, the first supporting elastomer is an adhesive tape.

Optionally, the second supporting elastomer is an adhesive tape.

Optionally, the optical component comprises a reflection plate, a light guide plate and an optical film, wherein the optical film is arranged on the second protruded platform.

There is further provided in an embodiment of the present disclosure a liquid crystal display apparatus, comprising a liquid crystal panel and a backlight module, wherein the backlight module is arranged at a side opposite to a side of the liquid crystal panel displaying an image, and comprises:
a backplate;
a backlight source and an optical component disposed on the backplate;
a frame configured to fix the backlight source and the optical component, wherein the top of the frame is provided a cover which is integrally formed with the frame and extends to a middle part of the backlight module;
the cover is arranged at the side of the liquid crystal panel displaying an image, corresponds to a non-display area of the liquid crystal panel, and is configured to fix the liquid crystal panel.

Optionally, an adhering layer is disposed on a lower surface of the cover, and is adhered to the non-display area of the liquid crystal panel.

Optionally, a protruded platform is disposed at the inner side of the frame close to the middle part of the backlight module;

a supporting elastomer is disposed on the lower surface of the cover a position of the supporting elastomer corresponds to the protruded platform; and the liquid crystal panel is arranged between the protruded platform and the supporting elastomer.

Optionally, a first protruded platform and a second protruded platform are disposed at the inner side of the frame close to the middle part of the backlight module;

a first supporting elastomer is disposed on the lower surface of the cover a position of the first supporting elastomer corresponds to the first protruded platform, a surface of the first protruded platform is adhered to a second supporting elastomer, and the liquid crystal panel is arranged between the first supporting elastomer and the second supporting elastomer; and the optical component comprises a reflection plate, a light guide plate and an optical film, wherein the optical film is arranged on the second protruded platform.

Optionally, the liquid crystal display apparatus further comprises a function panel fixedly arranged on the cover of the frame.

Optionally, the function panel is adhered to the cover via an optical adhesive; and the cover is of a plate-type structure, and an adhesive overflow groove is disposed on an upper surface of the cover, and at an edge of the function panel.

Optionally, the function panel is a touch panel or a grating.

The above technical solutions of the present disclosure have the following advantageous effects:

In the above technical solutions, the top of the adhesive frame of the backlight module has the cover which is integrally formed with the frame and extends to the middle part of the backlight module. When the liquid crystal display apparatus is assembled, the cover is configured to fix the display panel. Since the cover is integrally formed with the frame, the configuration of the backlight module is simplified. In addition, the cover has a higher rigidity, which raises firmness in fixing the liquid crystal panel. When the liquid crystal display apparatus further comprises the add-on function panel, the higher rigidity of the cover improves the adhering effect of the function panel and the backlight module greatly, so that the problem of light leakage and whitening would not occur around a product in the effect of pressure.

BRIEF DESCRIPTION OF THE DRAWINGS

In order to more clearly describe technical solutions in embodiments of the present disclosure or in the prior art, the accompanying figures used in the description of the embodiments or the prior art will be described below briefly. Obviously, the figures described below are just some embodiments of the present disclosure, and other figures can be obtained by those skilled in the art according to these figures without paying any inventive labor.

DETAILED DESCRIPTION

There is provided in the present disclosure a backlight module. Top of a frame of the backlight module has a cover which is integrally formed with the frame and extends to the middle part of the backlight module. When a liquid crystal display apparatus is assembled, the cover is configured to fix a display panel. The cover is integrally formed with the frame and has a higher rigidity, which raises firmness in fixing the liquid crystal panel. When a liquid crystal display apparatus includes an add-on function panel, the higher rigidity of the cover improves the adhering effect of the add-on function panel and the backlight module greatly, so that the problem of light leakage and whitening would not occur around a product in the effect of pressure.

Specific implementations of the present disclosure will be further described below in detail by combining with the figures and embodiments. Following embodiments are used to illustrate the present disclosure, but not used to limit the scope of the present disclosure.

Figure 4:
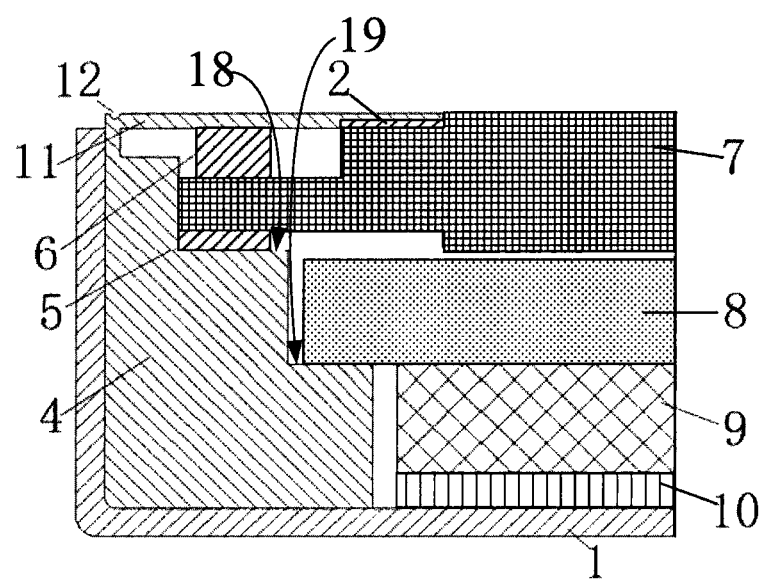
FIG. 4 is a schematic diagram showing a liquid crystal display apparatus in an embodiment of the present disclosure.

As shown in FIG. 4, there is provided in an embodiment of the present disclosure a backlight module including a backplate 1, a backlight source (not shown in the figure) and an optical component (the optical component includes a reflection plate 10, a light guide plate 9 and an optical film 8) disposed on the backplate 1. Lights emitted from the backlight source are emitted after being reflected, dispersed, and scattered by the optical component, and then the lights are provided to the liquid crystal panel 7.

The backlight module further includes a frame 4 configured to fix the backlight source and the optical component. Herein, at the top of the frame 4 is provided a cover 11 which is integrally formed with the frame 4 and extends to the middle part of the backlight module. When the liquid crystal display module (including the backlight module and the liquid crystal panel 7) is assembled, the cover 11 is arranged at a side of the liquid crystal panel 7 displaying an image, is corresponding to the non-display area of the liquid crystal panel 7, and is configured to fix the liquid crystal panel 7, so as to realize the assembling of the liquid crystal display module. Since the cover 11 and the frame 4 are formed integrally, the configuration of the backlight module is simplified. In addition, the cover 11 has a high rigidity, which raises firmness in fixing the liquid crystal panel 7, so that it is easier to realize the assembling of the liquid crystal display apparatus.

Further, an adhering layer 2 is disposed on a lower surface of the cover 11. In the liquid crystal display apparatus, the adhering layer 2 is corresponding to the non-display area of the liquid crystal panel 7, and the cover 11 is fixedly adhered to the liquid crystal panel 7 via the adhering layer 2, such that the backlight module and the liquid crystal panel 7 would be assembled more fixedly. In particular, the adhering lay 2 can be a double-sided adhesive tape.

Further, a first protruded platform 18 is disposed at the inner side of the frame 4 close to the middle part of the backlight module. The liquid crystal panel 7 is arranged on the first protruded platform 18. On one hand, the first protruded platform 18 can be matched with the cover 11 in a better way to realize the fixing of the liquid crystal panel 7. On the other hand, the first protruded platform 18 would make a certain mixed light distance maintained between the liquid crystal panel 7 and the backlight source.

As an optional implementation, a first supporting elastomer 6 is disposed on the lower surface of the cover 11, and has a position corresponding to the first protruded platform 18. The elastic deformation of the first supporting elastomer 6 can absorb the force acted on the liquid crystal panel 7, so as to protect the liquid crystal panel 7. At the same time, the first supporting elastomer 6 can further improve the cover 11's capability in bearing external pressure, so that the rigidity of the cover 11 is further raised.

Of course, a second supporting elastomer 5 can further be disposed on the surface of the first protruded platform 18, and the liquid crystal panel 7 is arranged between the first supporting elastomer 6 and the second supporting elastomer 5, so as to protect the liquid crystal panel 7 better.

In the actual manufacturing process, materials of the first supporting elastomer 6 and the second supporting elastomer 5 can be adhesive tapes, which not only have a function of buffering, but also have a function of fixing.

As shown in FIG. 4, the backlight module in the embodiment of the present disclosure particularly includes:

the backplate 1;

the frame 4, whose top has the cover 11 which is integrally formed with the frame 4 and extends to the middle part of the backlight module, wherein the first protruded platform 18 and the second protruded platform 19 are disposed at the inner side of the frame 4 close to the middle part of the backlight module, a second adhesive tape 5 is adhered to the surface of the first protruded platform 18, a first adhesive tape 6 whose position is corresponding to the first protruded platform 18 is adhered to the lower surface of the cover 11, and a double-sided adhesive tape 2 is adhered to the lower surface of the cover 11; and a backlight source (not shown in the figure), a reflection plate 10, a guide light plate 9 and an optional film 8 (including brightness enhancement film, a prism film and a diffusion film and so on) disposed on the backplate 1, wherein the optical film 8 is arranged on the second protruded platform 19, lights emitted from the backlight source are emitted to the optical film 8 uniformly under the effect of the guide light plate 9, the second protruded platform 19 can make a certain mixed light distance maintained between the guide light plate 9 and the optional film 8, and the reflection plate 10 is configured to reflect the lights, so that utilization of lights can be raised.

As shown in FIG. 4, the liquid crystal display apparatus in the embodiment of the present disclosure particularly includes:

the above mentioned backlight module;

the liquid crystal panel 7 arranged between the first adhesive tape 6 and the second adhesive tape 5, wherein the double-sided adhesive tape 2 is adhered to the non-display area of the liquid crystal panel 7.

Figure 5:
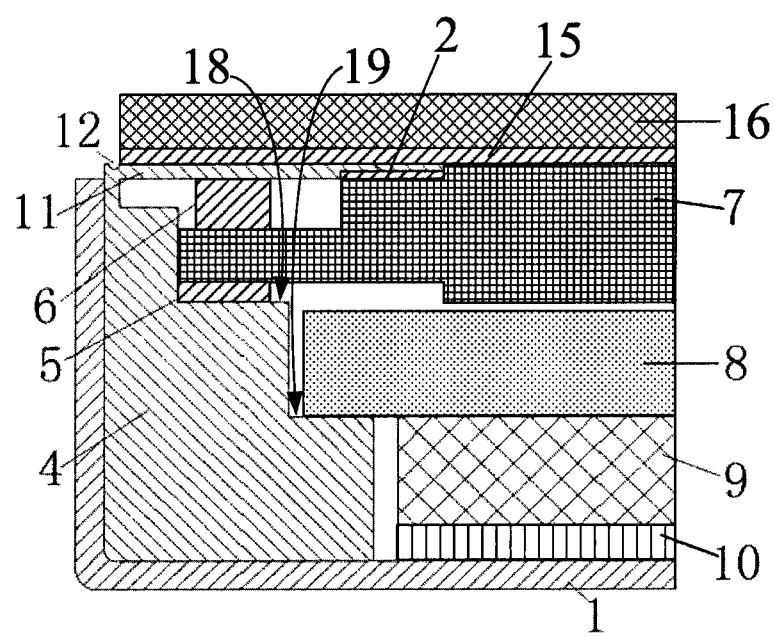
FIG. 5 is a schematic diagram showing a liquid crystal display apparatus in another embodiment of the present disclosure.

In a specific implementation, the liquid crystal display apparatus further includes a function panel 16, such as a touch panel and a raster, which is fixedly arranged on the cover 11 of the frame 4. As shown in FIG. 5, the cover 11 is integrally formed with the frame 4 and has a higher rigidity, and thus is deformed slightly under pressure, which ensures that the problem of light leakage and whitening would not occur around the product.

Herein, the function panel 16 is always fixed with the cover 11 of the frame 4 and the liquid crystal panel 7 by means of surface adhering. In particular, the entire surface of the function panel 16 is coated with an optical adhesive layer 15, and the surface of the function panel coated with the optical adhesive layer 15 is adhered to the cover 11 and the liquid crystal panel 7, so as to realize the assembling of the function panel 16.

Optionally, the first supporting elastomer 6 is disposed on the lower surface of the cover 11, and configured to carry the function panel 16, thereby improving the cover 11's capability in bearing the external pressure, so that the rigidity of the cover 11 is further raised.

Figure 1:
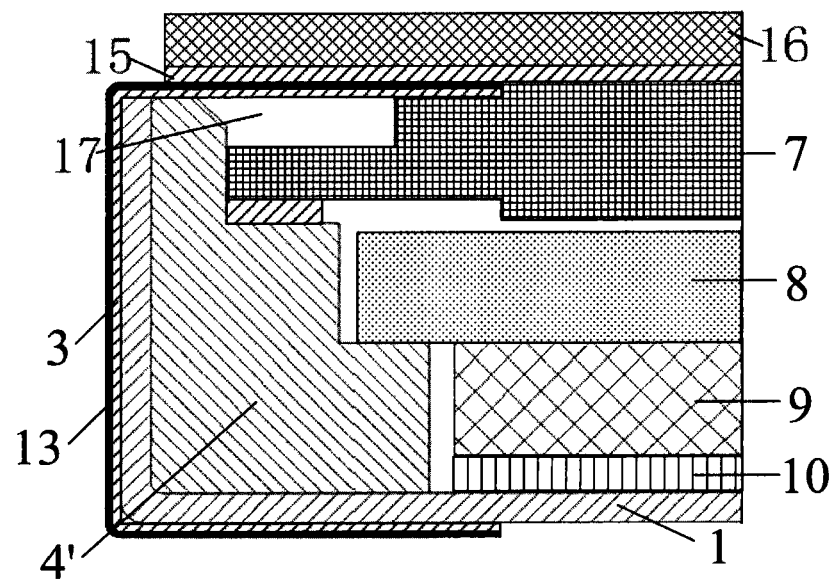
FIG. 1 is a schematic diagram showing an existing liquid crystal display apparatus.
Figure 2:
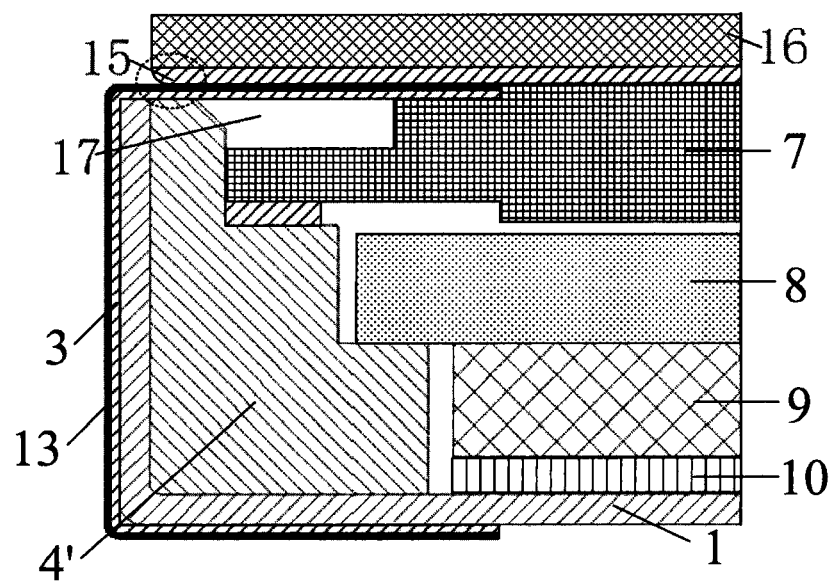
FIG. 2 is a schematic diagram showing adhesive deficiency occurring in adhering of a function panel when the existing liquid crystal display apparatus is assembled.
Figure 3:
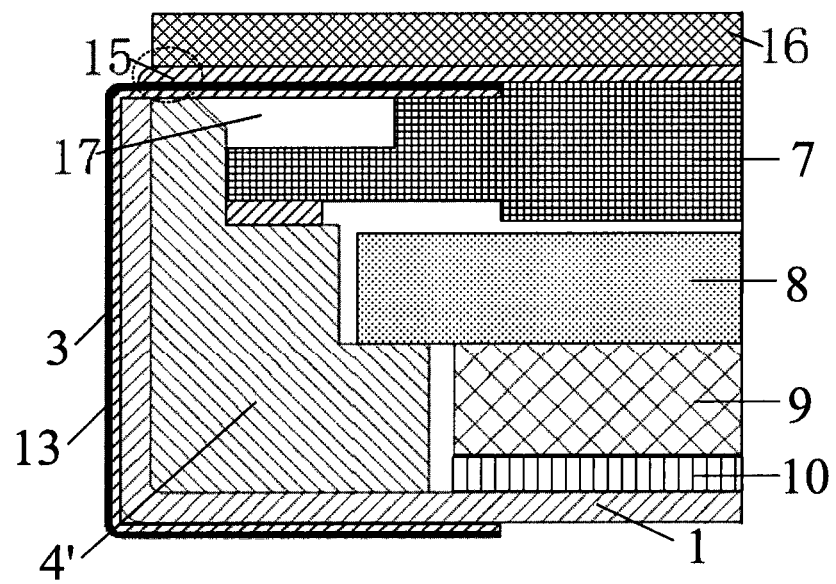
FIG. 3 is a schematic diagram showing adhesive overflow occurring in adhering of a function panel when the existing liquid crystal display apparatus is assembled.

When the function panel 16 and the liquid crystal display module are assembled by means of surface adhering, it is difficult to control the amount of the optical adhesive coated on the function panel 16. As shown in the dashed line block of FIG. 2, when the coating amount is small, phenomenon of adhesive deficiency would occur, which would influence the adhering firmness of the function panel 16. As shown in the dashed line block of FIG. 3, when the coating amount is large, phenomenon of adhesive overflow would occur, which would cause that the surface of the product is uneven, thereby affecting the quality of the product.

In order to solve the above technical problem, the cover 11 of the frame 4 in the embodiment of the present disclosure is a plate-type structure. An adhesive overflow groove 12 is disposed on the upper surface of the cover 11. In the liquid crystal display apparatus, the adhesive overflow groove 12 is arranged at the edge of the function panel 16. Then, when the liquid crystal display apparatus is assembled, substantial optical adhesive can be coated on the function panel 16. When the phenomenon of adhesive overflow occurs, the overflowed optical adhesive would be filled in the adhesive overflow groove 12, so that the surface of the product would become smooth, thereby ensuring the quality of the product.

As shown in FIG. 5, in the embodiment of the present disclosure, when the liquid crystal display apparatus includes the add-on function panel 16, it particularly includes:

the backplate 1;

the frame 4, whose top has the cover 11 which is integrally formed with the frame 4 and extends to the middle part of the backlight module, wherein the cover 11 is a plate-type structure, and the adhesive overflow groove 12 is disposed on the upper surface of the cover 11. The first protruded platform 18 and the second protruded platform 19 are disposed at the inner side of the frame 4 close to the middle part of the backlight module, the second adhesive tape 5 is adhered to the surface of the first protruded platform 18, the first adhesive tape 6 whose position is corresponding to the first protruded platform 18 is adhered to the lower surface of the cover 11, and the double-sided adhesive tape 2 is adhered to the lower surface of the cover 11;

the backlight source (not shown in the figure), the reflection plate 10, the guide light plate 9 and the optional film 8 (including a brightness enhancement film, a prism film and a diffusion film and so on) disposed on the backplate 1, wherein the optical film 8 is arranged on the second protruded platform 19, lights emitted from the backlight source are emitted to the optical film 8 uniformly under the effect of the guide light plate 9, the second protruded platform 19 can make a certain mixed light distance maintained between the guide light plate 9 and the optional film 8, and the reflection plate 10 is configured to reflect the lights, so that utilization of lights can be raised;

the liquid crystal panel 7 arranged between the first adhesive tape 6 and the second adhesive tape 5, the double-sided adhesive tape 2 being adhered to the non-display area of the liquid crystal panel 7; and the function panel 16 fixedly adhered to the cover 11 of the backlight module and the liquid crystal panel 7 via the optical adhesive layer 15, the adhesive overflow groove 12 on the upper surface of the cover 11 being arranged at the edge of the touch panel 16.

In the technical solutions of the present disclosure, the top of the frame of the backlight module has the cover which is integrally formed with the frame and extends to the middle part of the backlight module. When the liquid crystal display apparatus is assembled, the cover is configured to fix the display panel. Since the cover is integrally formed with the frame, the configuration of the backlight module is simplified. In addition, the cover has a higher rigidity, which raises firmness in fixing the liquid crystal panel. When the liquid crystal display apparatus further includes the add-on function panel, the higher rigidity of the cover improves the adhering effect of the function panel and the backlight module greatly, so that the problem of light leakage and whitening would not occur around a product in the effect of pressure.

The above descriptions are merely the preferred embodiments of the present disclosure. It should be pointed out that several improvements and substitutions can be further made by those skilled in the art without departing the technical principle of the present disclosure. These improvements and substitutions shall be deemed as falling into the protection scope of the present disclosure.

What is claimed is:

1. A backlight module, comprising:
a backplate;
a backlight source and an optical component disposed on the backplate; and
a frame configured to fix the backlight source and the optical component, wherein at the top of the frame is provided a cover which is integrally formed with the frame and extends to a middle part of the backlight module,
wherein a protruded platform is disposed at an inner side of the frame close to the middle part of the backlight module, and a first supporting elastomer is disposed on the lowersurface of the cover and a position of the first supporting elastomer corresponds to the protruded platform.

2. The backlight module according to claim 1, wherein a second supporting elastomer is disposed on a surface of the protruded platform, and the liquid crystal panel is arranged between the first supporting elastomer and the second supporting elastomer.

3. A backlight module, comprising:
a backplate;
a backlight source and an optical component disposed on the backplate; and
a frame configured to fix the backlight source and the optical component, wherein at the top of the frame is provided a cover which is integrally formed with the frame and extends to a middle part of the backlight module,
wherein a first protruded platform and a second protruded platform are disposed at an inner side of the frame close to the middle part of the backlight module, and a first supporting elastomer is disposed on the lower surface of the cover and a position of the first supporting elastomer corresponds to the first protruded platform.

4. The backlight module according to claim 3, wherein a second supporting elastomer is disposed on a surface of the first protruded platform, and the liquid crystal panel is arranged between the first supporting elastomer and the second supporting elastomer.

5. The backlight module according to claim 1, wherein the first supporting elastomer is an adhesive tape.

6. The backlight module according to claim 2, wherein the second supporting elastomer is an adhesive tape.

7. The backlight module according to claim 3, wherein the optical component comprises a reflection plate, a light guide plate and an optical film, wherein the optical film is arranged on the second protruded platform.

8. A liquid crystal display apparatus, comprising a liquid crystal panel and a backlight module, the backlight module being arranged at a side opposite to a side of the liquid crystal panel displaying an image, and comprising:
a backplate;
a backlight source and an optical component disposed on the backplate;
a frame configured to fix the backlight source and the optical component, wherein at the top of the frame is provided a cover which is integrally formed with the frame and extends to a middle part of the backlight module; and
the cover is arranged at the side of the liquid crystal panel displaying an image, corresponds to a non-display area of the liquid crystal panel, and is configured to fix the liquid crystal panel.

9. The liquid crystal display apparatus according to claim 8, wherein an adhering layer is disposed on a lower surface of the cover, and is adhered to the non-display area of the liquid crystal panel.

10. The liquid crystal display apparatus according to claim 8, wherein a protruded platform is disposed at an inner side of the frame close to the middle part of the backlight module;
a supporting elastomer is disposed on the lower surface of the cover and a position of the supporting elastomer corresponds to the protruded platform; and
the liquid crystal panel is arranged between the protruded platform and the supporting elastomer.

11. The liquid crystal display apparatus according to claim 8, wherein a first protruded platform and a second protruded platform are disposed at an inner side of the frame close to the middle part of the backlight module;
a first supporting elastomer is disposed on the lower surface of the cover and a position of the first supporting elastomer corresponds to the first protruded platform, a surface of the first protruded platform is adhered to a second supporting elastomer, and the liquid crystal panel is arranged between the first supporting elastomer and the second supporting elastomer; and
the optical component comprises a reflection plate, a light guide plate and an optical film, wherein the optical film is arranged on the second protruded platform.

12. The liquid crystal display apparatus according to claim 8, wherein the liquid crystal display apparatus further comprises a function panel fixedly arranged on the cover of the frame.

13. The liquid crystal display apparatus according to claim 12, wherein the function panel is adhered to the cover via an optical adhesive; and
the cover is of a plate-type structure, and an adhesive overflow groove is disposed on an upper surface of the cover and at an edge of the function panel.

14. The liquid crystal display apparatus according to claim 12, wherein the function panel is a touch panel or a grating.

15. The backlight module according to claim 3, wherein the first supporting elastomer is an adhesive tape.

16. The backlight module according to claim 4, wherein the second supporting elastomer is an adhesive tape.

* * * * *